US010739183B2

(12) United States Patent
Arbeau et al.

(10) Patent No.: US 10,739,183 B2
(45) Date of Patent: Aug. 11, 2020

(54) DEVICE FOR THE INDIVIDUALIZED MONITORING OF THE FEED CONVERSION RATIO OF POULTRY AND INSTALLATION COMPRISING SAID DEVICE

(71) Applicant: Selection Avicole de la Sarthe et du Sud Ouest (SASSO), Sabres (FR)

(72) Inventors: Thierry Arbeau, Montaut (FR); Laurent Salles, Mont de Marsan (FR)

(73) Assignee: SASSO, Sabre (FR)

( * ) Notice: Subject to any disclaimer, the term of this patent is extended or adjusted under 35 U.S.C. 154(b) by 190 days.

(21) Appl. No.: 15/961,193

(22) Filed: Apr. 24, 2018

(65) Prior Publication Data

US 2018/0306635 A1 Oct. 25, 2018

(30) Foreign Application Priority Data

Apr. 25, 2017 (EP) ..................................... 17167905

(51) Int. Cl.
*G01G 19/00* (2006.01)
*G01G 13/00* (2006.01)
(Continued)

(52) U.S. Cl.
CPC ............... *G01G 17/08* (2013.01); *A01K 5/02* (2013.01); *A01K 39/01* (2013.01); *A01K 39/012* (2013.01); *G01G 13/006* (2013.01); *G01G 19/00* (2013.01)

(58) Field of Classification Search
CPC ........ A01K 5/02; A01K 39/012; A01K 39/01; A01K 19/00; A01K 13/006; A01K 17/08
(Continued)

(56) References Cited

U.S. PATENT DOCUMENTS 6,427,197 B1 * 7/2002 Sato ..................... G11C 7/1039
365/189.15
6,497,197 B1 * 12/2002 Huisma .................... A01K 5/02
119/75
(Continued)

FOREIGN PATENT DOCUMENTS

FR 2893822 A1 6/2007
FR 2998135 A1 5/2014

*Primary Examiner* — Jacques M Saint Surin
(74) *Attorney, Agent, or Firm* — Pearne & Gordon LLP

(57) ABSTRACT

The invention relates to a device (100) for the individualized monitoring of the feed conversion ratio of poultry comprising:
a weighing station (30) comprising side walls and a front wall defining an available internal volume able to contain a bird,
a bird identification means (40), able to identify one bird positioned in the available internal volume of the weighing station (30) and to provide identification information of the bird,
a bird weighing means (10), able to measure the weight of one bird positioned in the available internal volume of the weighing station (30) and to provide weight information of the bird,
a feeder (50) containing poultry feed, coupled to a feed weighing means (20) able to measure the weight of the feed contained in the feeder (50) and to provide weight information of the feed, wherein said feeder (50) comprises a dispensing area (51), wherein said dispensing area (51) is accessible only to one bird positioned in the available internal volume of the weighing station (30), and
a data processing module ( ) coupled to the bird weighing means (10) and to the feed weighing means (20) able to generate a feed conversion ratio from the weight information provided by the weighing means (10) and by the
(Continued)

Figure 1:
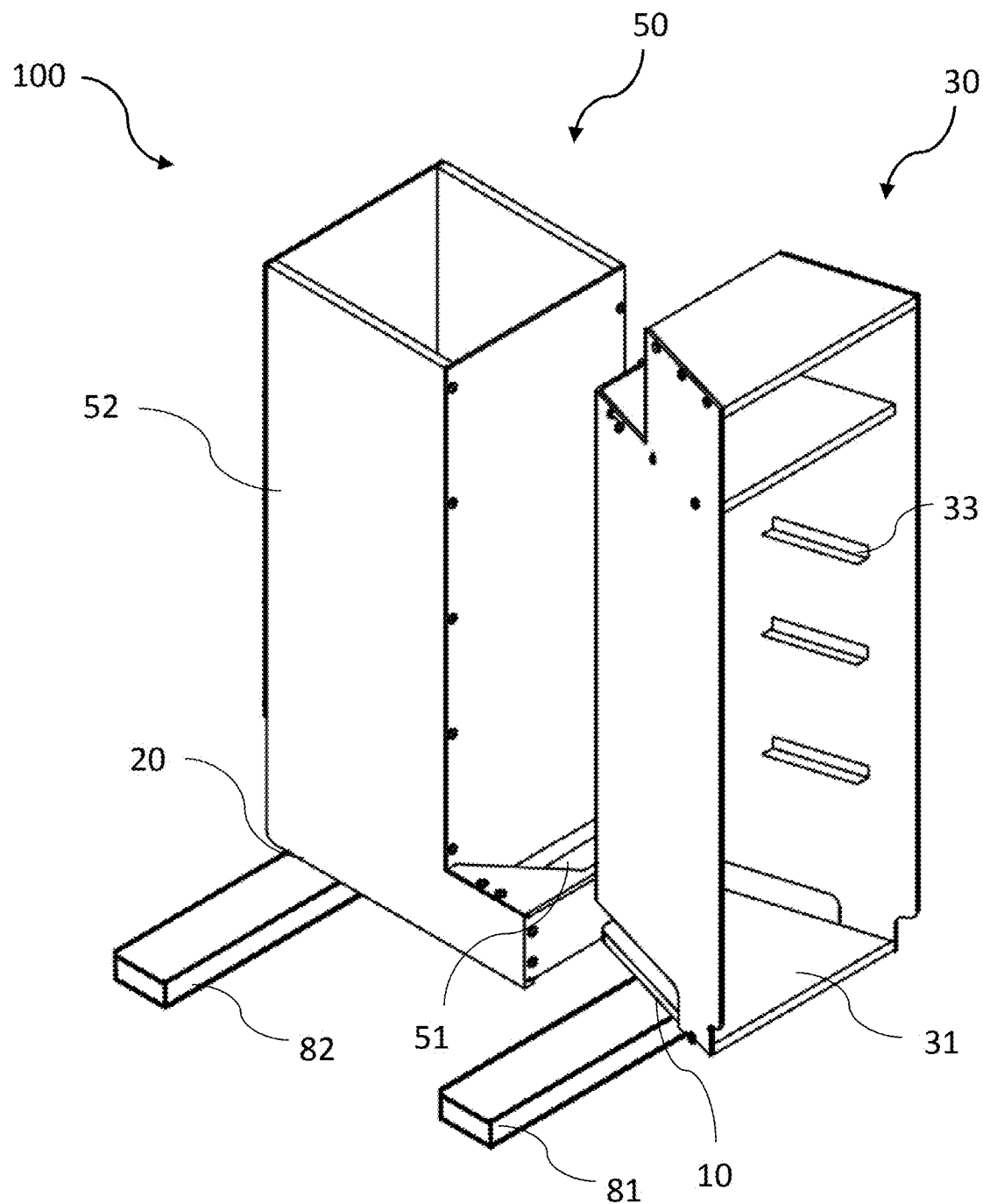

feed weighing means (20), for the bird identified from the identification information provided.

<p align="center">20 Claims, 6 Drawing Sheets</p>

(51) Int. Cl.
*A01K 39/01* (2006.01)
*A01K 5/02* (2006.01)
*A01K 39/012* (2006.01)
*G01G 17/08* (2006.01)

(58) Field of Classification Search
USPC .................................................. 177/25.12
See application file for complete search history.

(56) <p align="center">References Cited</p>

<p align="center">U.S. PATENT DOCUMENTS</p>

| | | | |
|---|---|---|---|
| 8,797,166 B2 * | 8/2014 | Triener | G01G 17/08 340/573.1 |
| 8,930,148 B2 * | 1/2015 | Huisma | A01K 5/02 702/19 |
| 9,137,974 B2 * | 9/2015 | Boehm | A01K 5/0291 |
| 9,723,815 B2 * | 8/2017 | Epema | A01K 5/02 |
| 2004/0101860 A1 * | 5/2004 | Jones | C12Q 1/689 435/6.18 |
| 2009/0320761 A1 * | 12/2009 | Grave | A01K 5/0233 119/51.02 |
| 2012/0299731 A1 * | 11/2012 | Triener | G01G 17/08 340/573.1 |

* cited by examiner

DEVICE FOR THE INDIVIDUALIZED MONITORING OF THE FEED CONVERSION RATIO OF POULTRY AND INSTALLATION COMPRISING SAID DEVICE

The invention relates to the field of poultry rearing, and more particularly to poultry selection. The invention relates to a device for the individualized monitoring of the feed conversion ratio of poultry, as well as to an installation comprising a plurality of individualized monitoring devices.

PRIOR ART

Poultry rearing, and especially chicken rearing, most frequently consists in group floor rearing where the birds are fed using for example common feeders from which the animals are free to come and go.

In these common feeders, one bird may have a feed intake different from the other birds, but also variable in time, and determining at a given moment the individual consumption and the impact of this consumption on the weight of said bird is difficult. Yet, as part of an optimized management of a poultry farm or poultry selection, monitoring the feed conversion ratio of a bird in an individualized manner is desirable. In particular, it is important to be able to monitor the feed consumption of the animals, in order to correlate it with their growth (increase in live weight), and thus assess the feed conversion ratio of the birds. The feed conversion ratio of poultry corresponds to the ratio amount of feed consumed by the bird/weight gain of the bird. In current practice, monitoring the feed conversion ratio is generally done around the sixth week, manually. Such a practice is, on the one hand, time consuming and, on the other hand, it does not take into account the variation as a function of the age of the birds and the interindividual variability of the metabolism. Such interindividual variability can only be fully taken into account with a measurement carried out throughout the growth of the bird.

For such a monitoring to be carried out throughout the growth of the bird, it is necessary to have a tool capable of measuring the feed consumption from the first days of the bird up to its adulthood.

In group floor farms, the average feed amount consumed per bird can usually be known only by dividing the total amount of feed consumed by the number of birds in the batch. However, this does not allow for an accurate individual monitoring of consumption and is therefore not exploitable for animal selection or individualized management. In the prior art, there are systems for automatically monitoring the individual feed intake of the birds. Nevertheless, as described in patent application FR2893822, this feed intake is not correlated to a system for individually measuring the weight of the bird. In this case, these systems for individually monitoring the feed intake can be coupled with automatic bird weighing systems, but the current automated systems for individually measuring the weight of the birds are not efficient. In effect, in practice, on the one hand, several birds go up on the weighing station and, on the other hand, the measurement is not individualized, and does not allow for the identification of the bird. Thus, the analysis is done for a set of individuals and requires a statistical reprocessing of the information. Currently, it is therefore possible only to make estimates of the live weight of the birds from the group information.

Other systems, manual or automatic, rely on devices in which the bird is locked up to eat and in which the weight of the feed intake is monitored. Nevertheless, poultry are animals used to living in groups and in the context of a group farm, such isolation in order to eat disrupts the birds and thus the feed intake. In addition, a group-, floor-reared bird will not have the same physical expenditure as a bird reared in a cage on a restricted surface.

Therefore, there is a need for new devices or installations, for the individualized monitoring of the feed conversion ratio of poultry, for responding to the problems caused by existing methods.

Technical Problem

The invention therefore aims to overcome the disadvantages of the prior art.

In particular, the invention aims to provide an improved device for the individualized monitoring of the feed conversion ratio of poultry, wherein said device allows to measure the individual consumption of a bird, regardless of its age, and especially allows for reliable, individualized and automated measurements of the feed intake and the live weight of a bird in order to calculate its feed conversion ratio over a given period. In addition, this device aims to adapt to the needs of birds reared in groups on the floor and to not disturb them during the feed intake.

The invention further aims to provide an installation comprising a plurality of individualized monitoring devices, wherein said installation allows to measure the individual consumption of animals reared in groups on the floor, in an accurate and simple manner, and at a reduced cost.

BRIEF DESCRIPTION OF THE INVENTION

To this end, the invention relates to a device for the individualized monitoring of the feed conversion ratio of poultry comprising:
  a weighing station, wherein said weighing station comprises side walls and a front wall defining an available internal volume able to contain a bird,
  a bird identification means, able to identify one bird positioned in the available internal volume of the weighing station and to provide identification information of the bird,
  a bird weighing means, wherein said bird weighing means is able to measure the weight of one bird positioned in the available internal volume of the weighing station and to provide weight information of the bird,
  a feeder containing poultry feed, coupled to a feed weighing means, wherein said feed weighing means is able to measure the weight of the feed contained in the feeder and to provide weight information of the feed, wherein said feeder comprises a dispensing area, wherein said dispensing area is accessible only to one bird positioned in the available internal volume of the weighing station, and
  a data processing module coupled to the bird weighing means and to the feed weighing means able to generate a feed conversion ratio from the weight information provided by the weighing means and by the feed weighing means, for the bird identified from the identification information provided.

Thus, thanks to the invention, it is possible to carry out an individualized monitoring of the feed conversion ratio of poultry from a single device capable of carrying out the weighing of the feed ingested by the bird, the weighing of the bird and the identification of the bird.

According to other optional features of the device:

the weighing station has a front wall with an opening able to allow the head of the bird to pass, wherein said opening has a shape defined by a variable height and width and, wherein said width increases with the height value over a distance representing more than half the height of said opening. Such an opening shape allows to adapt to the bird, regardless of its age. Thus, it is not necessary to manually change the opening or put in place a device for automatically changing the size of said opening since it has an adapted shape, the width of which increases with the height and therefore with the size of the bird.

the opening has a substantially trapezoid or triangle shape, wherein the base of the triangle or the longest base of the trapezoid is oriented towards the upper part of the front wall.

the side walls and the front wall of the weighing station are not movable.

the weighing station is associated with a restraint system comprising at least one means for adapting the volume and/or at least one means for blocking a part of the entrance of the weighing station, wherein said means for adapting the volume is able to reduce the available internal volume of said weighing station so as to adapt it to the size of said bird and said means for blocking a part of the entrance of the weighing station is able to prevent several birds from entering simultaneously into the available internal volume of said weighing station. Thus, the internal available volume of the weighing station can be easily modified by substituting a first volume adaptation means dedicated for example to chickens of 2 weeks or less by a volume adaptation means dedicated to chickens over 3 weeks. The weighing station also has an internal available volume adapted to accommodate a single bird, and thus there is but one bird in the weighing station and therefore the measurement is reliable.

the restraint system is removable. Thus, the available internal volume can be easily adapted in order to follow the evolution of the size of the bird during its growth.

the weighing station comprises guide members for the restraint system such as articulated arms, grooves, telescopic rods, notches, or cleats.

the feeder is coupled to at least one displacement means able to move the feeder at least along one axis, wherein said axis is selected from a vertical, horizontal, or transverse axis, so as to adjust the distance between the feed dispensing area of the feeder and the weighing station to the size of the bird and the evolution of its morphology. Thus, the device comprises displacement means allowing to control the distance between the feed dispensing area and the front face of the weighing station so as to allow for an optimum feed intake, regardless of the age of the bird.

the at least one displacement means is able to move the feeder at least along a horizontal axis or a vertical axis. Preferably, the at least one displacement means is able to move the feeder along a horizontal axis and a vertical axis, such as a transverse axis.

the identification means comprises a radio frequency (for example RFID or NFC) reader able to receive information from a radio frequency tag attached to said bird. RFID technology is particularly suitable for this type of monitoring.

the radio frequency reader is positioned near a front or side wall of the weighing station. Such positioning allows to identify a bird during an individual weighing without nearby birds having their tags identified in place of the bird being weighed.

The invention further relates to an installation comprising at least two monitoring devices according to the invention.

According to other optional features of the installation:

the weighing stations of the monitoring devices are attached directly or indirectly to a first cross member and the feeders of the monitoring devices are attached directly or indirectly to a second cross member.

the cross member is able to be moved, by a displacement means, along a vertical and a horizontal axis.

the feeders are attached directly or indirectly to a cross member, wherein said cross member is able to be moved, by a displacement means, at least along one axis, wherein said axis is selected from a vertical, horizontal or transverse axis. This allows to adjust the distance between the feed dispensing area of the feeder and the weighing station, depending on the size of the bird.

Other advantages and characteristics of the invention will appear upon reading the following description given by way of illustrative and non-limiting example, with reference to the appended figures which represent:

FIG. 1, a partial schematic representation in perspective of an individualized monitoring device according to the invention.

FIGS. 2A to 2D, schematic representations of different shapes of the opening on the front wall of the weighing station.

Figure 3:
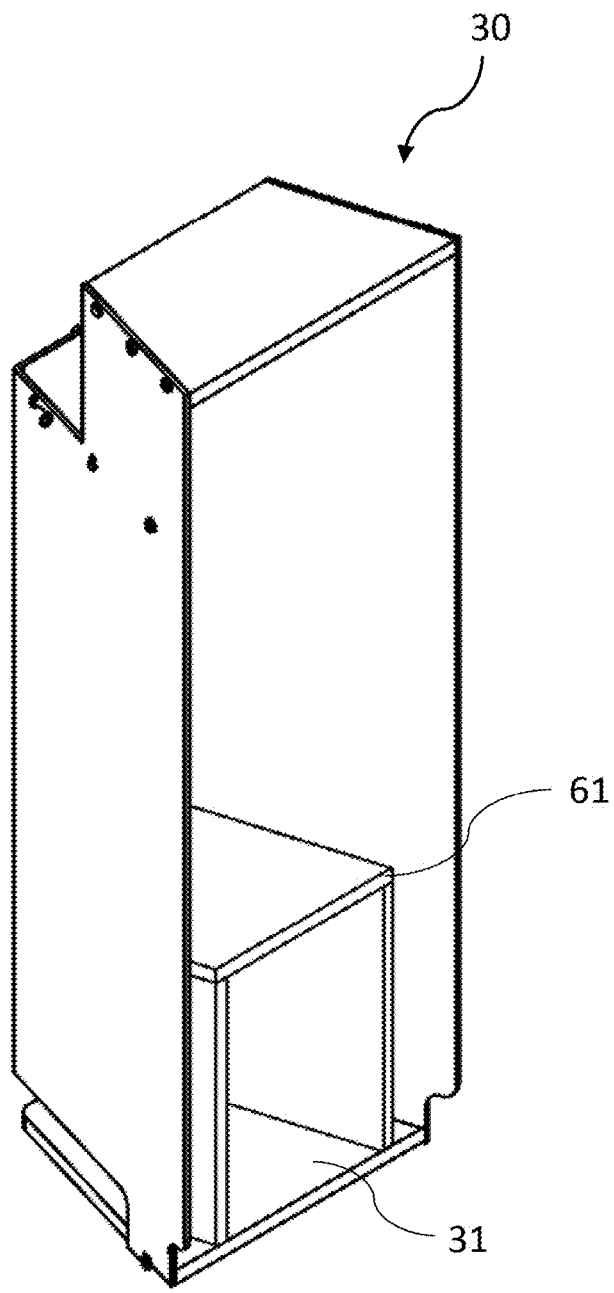

FIG. 3, a perspective representation of a weighing station comprising a means for adapting the volume and connected to a cross member via of a bird weighing means.

Figure 4A:
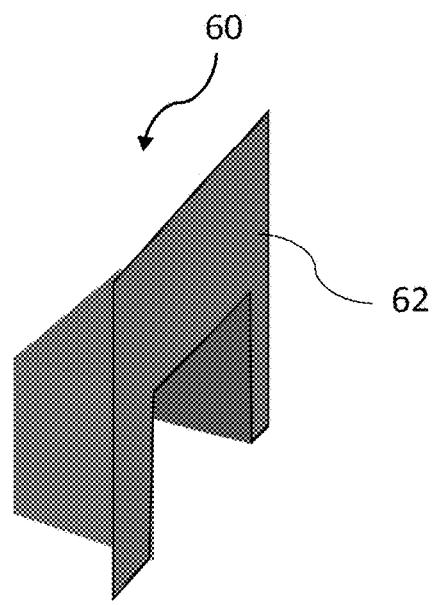
Figure 4B:
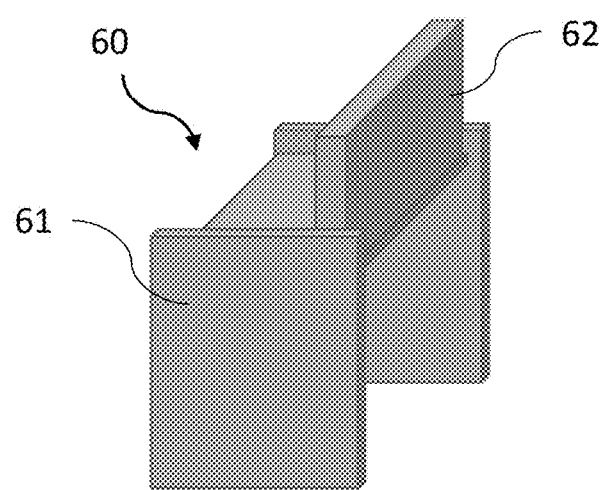
Figure 4C:
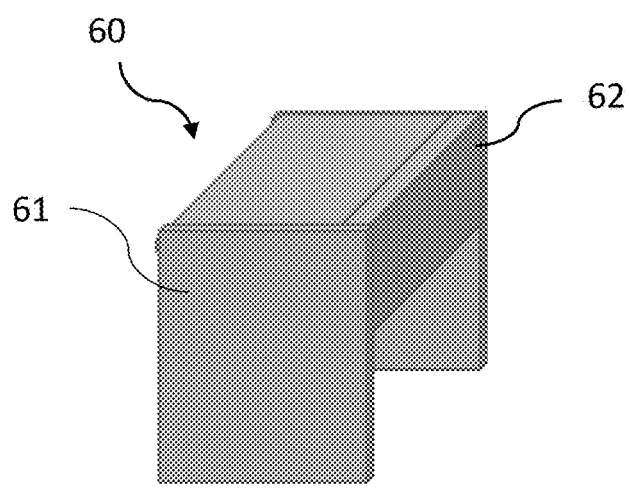

FIGS. 4A to 4C, graphic representations of different shapes of the means for adapting the volume and the blocking means according to the invention.

Figure 5A:
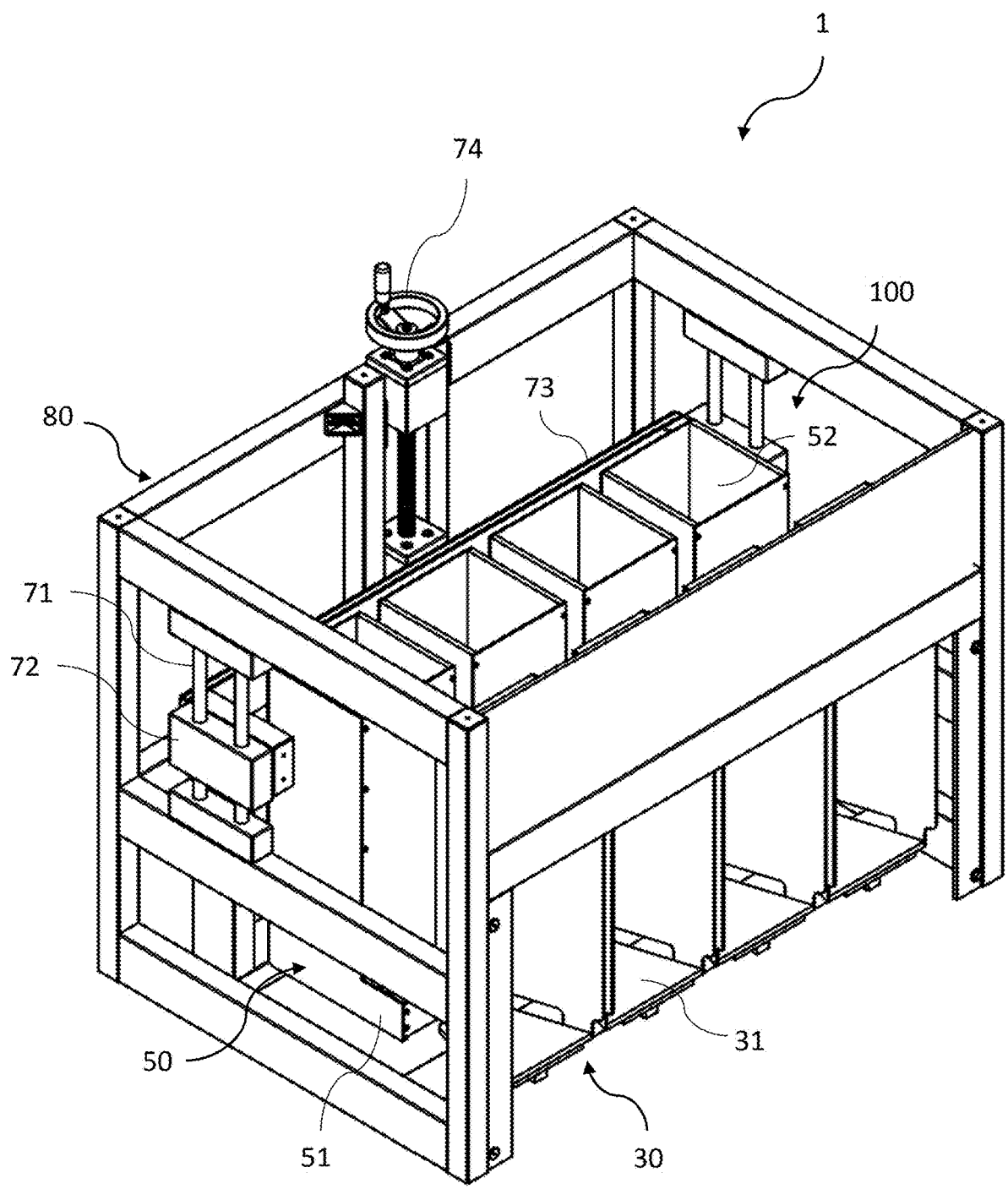
Figure 5B:
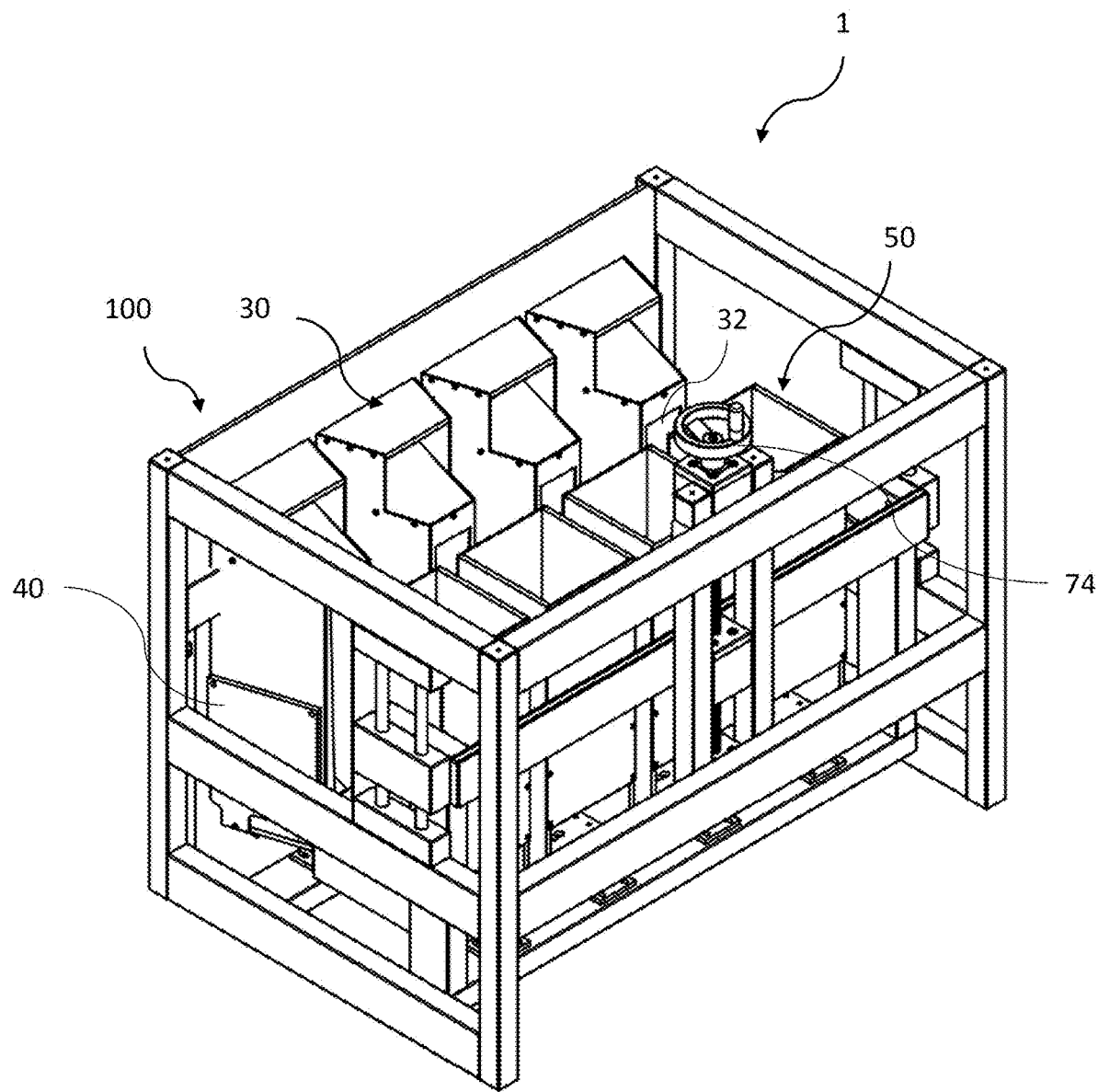

FIGS. 5A and 5B, two perspective views, from the front (FIG. 5A) and the back (FIG. 5B), illustrating the arrangement of four monitoring devices according to the invention mounted on the frame of the monitoring installation according to the invention.

DESCRIPTION OF THE INVENTION

By "internal volume available" is meant, within the meaning of the invention, the volume within the weighing station, available for one bird. The bird, within the weighing station, is preferably positioned on a weighing platform.

By "adapted to accommodate one bird" is meant, within the meaning of the invention, that the internal available volume allows only one bird to position within the weighing station.

The term "substantially" or the expression "substantially identical" according to the invention corresponds to a value ranging from less than 30% with respect to the compared value, preferably less than 20%, even more preferably less than 10%. When substantially identical is used to compare shapes, then the vectorized shape varies from less than 30% with respect to the compared shape, preferably less than 20%, even more preferably less than 10%.

The term "removable", within the meaning of the invention, corresponds to the ability to be easily detached, removed, or disassembled without having to destroy attachment means, either because there is no attachment means or because the attachment means are easily and quickly removable (e.g. notch, screw, tab, lug, clip). For example, by removable is to be understood that the object is not attached by welding or by another means not designed for detaching the object.

In the remainder of the description, by "radio frequency reader" is meant an electronic device comprising at least one radio frequency transmitter/receiver and at least one radio frequency antenna such as an RFID (acronym for "Radio Frequency IDentification" meaning identification by radio frequencies) antenna. An RFID antenna is able to emit electromagnetic waves capable of activating an RFID tag located in its electromagnetic radiation field. The radio frequency reader transmits via electromagnetic waves, emitted by the radio frequency antenna, an information request to the radio frequency tags located in its radiation field, and then it receives the responses and transmits them to the applications concerned. The frequency used varies according to the intended applications and the desired performance. Communication between the radio frequency reader and the radio frequency tag is performed by electromagnetic waves (of the radio frequency type) by means of the radio frequency antennas in the reader and in the radio frequency tag. The radio frequency reader is in practice in the form of an electronic device generally comprising an integrated circuit chip and at least one radio frequency antenna coupled to said integrated circuit chip. The integrated circuit chip is able to generate, and shape, the digital signal containing the information to be transmitted to the radio tags, as well as to process the return signal. Several radio frequency technologies can be used in the context of the invention such as Bluetooth, WiFi, or NFC (Near Field Communications). The preferred radio frequency technologies are RFID or NFC.

By "radio frequency antenna" is meant, within the meaning of the invention, a means coupled to a radio frequency reader, to an NFC tag, or to an RFID tag able to receive and/or emit electromagnetic waves (of the radio frequency type). For example, in the RFID field, various radio frequencies can be used: between 125 kHz and 135 kHz (Low Frequencies), 13.56 MHz (High Frequencies), 860-960 MHz (Ultra High Frequencies), 2.45 GHz (microwave band) and 3.1-10.6 GHz (ULB band, Ultra Large Band, or UWB, for Ultra Wide Band).

By "RFID tag", also called RFID tag, transponder, or marker, is meant a device generally comprising an electronic component such as an integrated circuit chip and a radio frequency or RFID antenna able to interact with the radio frequency or RFID reader. When the radio frequency technology is RFID technology, then there are several categories of RFID tags:
- the passive RFID tag, not incorporating any electrical power. The passive RFID tag uses the wave from the RFID reader to power the on-board electronic circuit;
- the semi-passive RFID tag incorporating a power supply used to supply energy to the electronic circuit of the tag or to a sensor connected to said circuit;
- the active RFID tag incorporating a radio frequency transmitter and therefore a power supply (batteries). This tag can interact autonomously with its environment thanks to its battery.

In the remainder of the description, the same references are used to designate the same elements.

As illustrated by the diagram of FIG. 1, the individualized monitoring device 100 comprises a means 10 for weighing a bird, a means 20 for weighing feed, a weighing station 30, the internal available volume of which is adapted to accommodate one bird, wherein said weighing station 30 is coupled to the means 10 for weighing a bird, a means 40 for identifying said bird, and a feeder 50, coupled to the means 10 for weighing feed contained in the feeder 50, wherein said feeder 50 comprises a feed dispensing area 51 accessible only to said bird.

The weighing station 30 and the feeder can be placed on a front cross member 81 and on a rear cross member 82, respectively. Indeed, the weighing station 30 and the feeder 50 are preferably positioned on separate elements of a frame 80 ensuring the various elements constituting the individualized monitoring device 100 are held together.

The weighing station 30 is preferably positioned opposite the feeder 50. The front wall of the weighing station 30, facing the feeder 50, is preferably positioned at a distance between 1 cm and 25 cm, more preferably between 2 cm and 15 cm, from the edge of the feed dispensing area 51 facing the weighing station 30. Even more preferably, as detailed below, the distance between the front wall of the weighing station 30 and the edge of the dispensing area 51 is controlled by a displacement means 70.

The weighing station 30 has an internal available volume adapted to accommodate one bird. Indeed, in the context of an individualized monitoring, it is desirable that the birds integrate the station only individually. Typically, the weighing station comprises a weighing platform 31 on which a bird must position if it wishes to access the feed contained in the feeder 50 and accessible via the dispensing area 51.

In addition, the weighing station 30 may advantageously comprise, on a front wall, an opening 32 able to allow the head of the bird to pass, wherein said opening 32 has a shape defined by a variable width and height and, wherein said variable width increases with the height value over a distance representing more than half the height of said opening. This particular shape allows to avoid having to size the opening according to the size of the head of the birds of the reared batch, or to adapt it according to the age of the birds. The shape provided by the inventors, as part of the individualized monitoring device 100 according to the invention, allows for an opening accessible to the birds, regardless of their age, while limiting the possibility of a second bird accessing the feed when a first bird is positioned on the weighing station 30. Thus, it is not necessary to adapt the size of the opening 32 throughout the development of the bird, from a young age (a few days) to adulthood (several weeks). This contributes to the advantages of the invention, making it suitable for poultry farms where rearing is done over long periods, for example during poultry selection. Preferably, the opening is perpendicular to the ground as shown in FIG. 1.

Figure 2A:
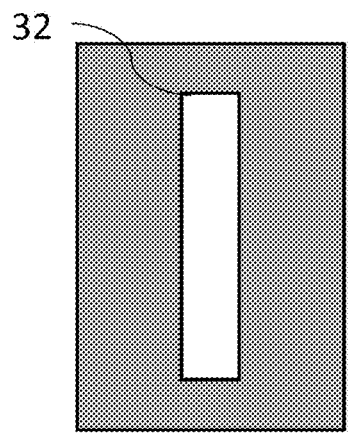
Figure 2B:
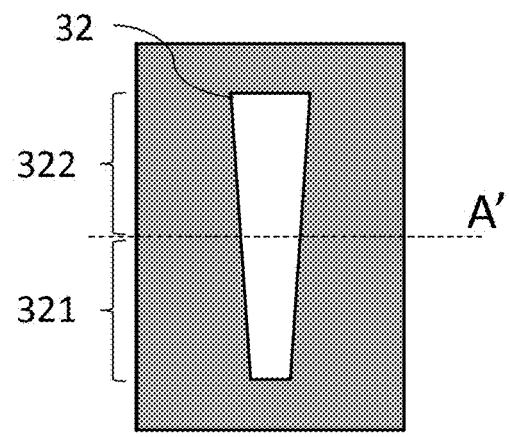
Figure 2D:
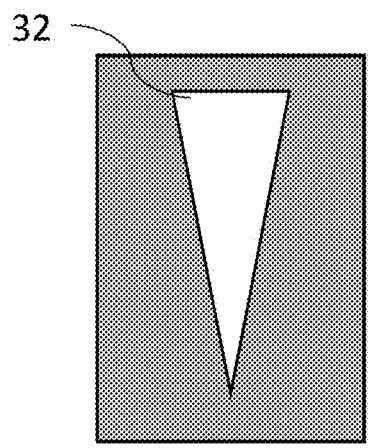
Figure 2C:
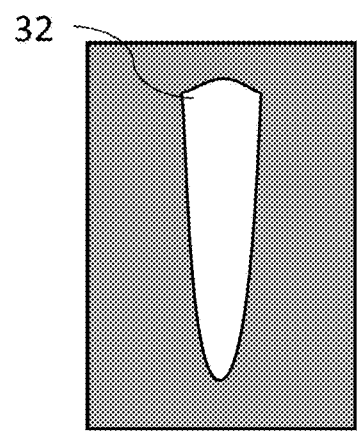

In particular, the opening 32 is positioned centrally with respect to the feeder 50 and centered with respect to the side walls of the weighing station 30. By way of non-limiting example, and as shown in FIGS. 2A to 2D, the opening may have a trapezoid (FIG. 2B), triangle (FIG. 2C), or substantially trapezoid or triangle (FIG. 2D) shape. The opening may also have a constant width over its entire height as shown in FIG. 2A. The opening 32 may have a height between 15 and 65 cm, preferably between 25 and 50 cm. Such a height allows for an easy access to the feed by the bird and this throughout its growth. In addition, the absence of a lower edge on which a bird could come to rest and thus cause an incorrect measurement of the weight of the bird, as could be the case with a circular opening, is advantageous.

The width of the opening 32 is for example between 4 cm and 15 cm. More particularly, the opening 32 may have a width, on its lower part 321, between 4 cm and 8 cm, and on its upper part 322, between 6 cm and 15 cm. The lower 321 and upper 322 parts each correspond to one half of the height of the opening 32 (e.g. lower half and upper half).

Preferably, the weighing station 30 has no door. Indeed, during their feed intake, the birds can be disturbed if they come to be locked up in a confined space of a small size. Such a confinement may have a negative impact on the feed intake and therefore on the weight gain. Thus, the invention has the advantage of allowing for an individualized monitoring without having to enclose the bird in the weighing station 30.

The weighing station 30, for example, has a total internal volume between 10,000 cm³ and 20,000 cm³, preferably between 14,000 cm³ and 18,000 cm³. In addition, as shown in FIGS. 1 and 3, the weighing device 30 preferably has a front face, opposite the feeder 50, which is narrower than the rear face. For example, the width of the front face is advantageously less than 50% the width of the rear face.

Each individualized monitoring device 100 further comprises a means 10 for weighing a bird, coupled to the weighing station 30 and allowing to measure the weight of the weighing station 30 and therefore, via a tare function of the means 10 for weighing a bird, to infer the weight of the bird.

Such a means 10 for weighing a bird allows to measure the weight of the bird as well as its evolution over time, and thus, by correlating this bird weight data with the bird identification data, to deduce the evolution of the weight of the bird over time. The means 10 for weighing a bird may for example be a bending sensor, a force sensor, or a pressure sensor, producing an electrical, optical, or magnetic signal proportional to the force applied to the weighing platform 31 by the bird. More particularly, the sensors used may for example be strain gages, piezoelectric sensors, piezoresistive sensors, or capacitive pressure sensors.

According to a preferred embodiment, the means 10 for weighing a bird comprises at least one sensor, preferably of the piezoelectric or piezocapacitive type, or at least one strain gage, positioned between a front cross member 81 and the weighing station 30. Even more preferably, the weighing station 30 is connected to a front cross member 82 by at least one piezoelectric- or piezoresistive-type sensor, or by a strain gage.

The inventors have developed a poultry restraint system 60 to more effectively limit access to the feeder 50 to a single bird, yet without forcing it. This absence of constraint allows to not modify its natural behavior and therefore its feed intake, contrary to what the presence of a door on the device according to the invention could induce. The restraint system 60 comprises at least one means 61 for adapting the volume and/or at least one means 62 for blocking a part of the entrance of the weighing station 30. Thus, the weighing station 30 may be associated with at least one means 61 for adapting the volume able to change the internal available volume of said weighing station 30 to adapt it to the size of said bird. The weighing station 30 may be associated with at least one means 62 for blocking a part of the entrance of the weighing station 30 to prevent several birds from entering simultaneously. Preferably, the restraint system 60 is removable. Namely the one or more means 61 for adapting the volume or the one or more blocking means 62 are removable, independent of the weighing station 30 and can thus be quickly separated from the weighing station. This allows, for example, to quickly clean the weighing station 30. In addition, the means 61 for adapting the volume and the blocking means 62 may be movable so as to adapt the internal available volume of the weighing station 30 to the size of the bird.

Preferably, the means 61 for adapting the volume allows to reduce the height as well as the width of the available internal volume of the weighing station 30. In fact, in the absence of a reduction in height, the birds can mount one on top of the other so as to reach the dispensing area 51. This is particularly true during the first weeks of rearing.

The means 62 for blocking the weighing station 30 is arranged so as to limit access to the weighing station 30 to the internal available volume as modified by the means 61 for adapting the volume. Thus, the blocking means 62 allows to prevent birds from coming into the weighing station 30 and, although they are unable to reach the feeder, from disturbing the weighing.

The diagram of FIG. 3 illustrates a means 61 for adapting the volume in the form of an insert able to reduce the internal available volume of the weighing station 30, so as to adapt it to the size of said bird. FIGS. 4A to 4C represent several restraint systems 60 comprised of means 61 for adapting the volume and/or blocking means 62 adapted to reduce the internal volume of the weighing station 30 accessible to the bird. Particularly, the restraint system 60 consists of an insert able to reduce the internal volume of the weighing station 30 to adapt it to the size of said bird. Preferably, the restraint system 60 and more particularly the means 61 for adapting the volume and the blocking means 62 consist of an assembly of plates which, depending on their arrangement, reduce more or less the available internal volume of the station weighing 30.

In a particularly preferred manner, the restraint systems 60 and more particularly the means 61 for adapting or 62 for blocking the volume, all have the same weight, regardless of the available internal volume they are able to define within the weighing station 30. Thus, it is not necessary to tare the bird weighing means 20 when the means 61 for adapting or 62 for blocking the volume follow the growth of the birds.

Advantageously, the side walls and the front wall of the weighing station 30 are not movable. In particular, the weighing station 30 may comprise guide members 33 for the restraint system 60 and more particularly for the at least one means 61 for adapting the volume and/or the at least one means 62 for blocking the volume such as notches, articulated arms, grooves, telescopic rods, or cleats. Preferably, the weighing station 30 comprises notches, grooves, or cleats, able to hold and position the at least one means 61 for adapting the volume and/or the at least one means 62 for blocking the volume. These guide members 33 may be positioned on the internal face of the side walls of the weighing station 30 as shown in FIG. 1 or on the weighing platform 31.

In addition, each individualized monitoring device 100 comprises a feeder 50, illustrated in FIG. 1, which is intended to receive the feed to be provided to the bird. Preferably, the feeder 50 comprises a reserve 52 intended to receive the feed. This reserve 52 stores the feed the bird will eat from the dispensing area 51 of the feeder 50.

In addition, this feeder 50 may be coupled to a feeding circuit capable of ensuring a regular filling of the feeder 50 with feed, preferably in a continuous manner. Alternatively, filling the feeders 50 can be done manually.

In a particularly preferred manner, within the individualized monitoring device 100 according to the invention, the feeder 50 is movable. Such mobility allows to facilitate the feed intake throughout the growth of the birds. In fact, during the first days of life of the birds, the feeder 50, and more particularly the dispensing area 51, must be as close as possible to the front wall of the weighing station because the length of the neck of the birds may, for example, be of only 3 cm. However, as the weeks go by, the birds grow and the increase in the distance between the feeder 50 and the weighing station 30 allows for an easier feed intake for adult birds, the neck of which can measure up to 20 cm. Thus, the feeder 50 is preferably coupled to at least one displacement means 70 able to move the feeder 50 at least along one axis, wherein said axis is selected from a vertical, horizontal, or transverse axis, so as to adjust the distance between the feed dispensing area 51 of the feeder 50 and the weighing station 30 to the size of the bird. More preferably, the at least one displacement means 70 is able to move the feeder 50 along a horizontal axis and a vertical axis, for example along a transverse axis. In addition to an improved feed intake, this arrangement of the feeder 50 with respect to the weighing station 30, and the possibility of moving the feeder 50 away, in particular along a horizontal axis, allows to force the birds, in order to feed, to position properly within the weighing station 30 to facilitate the identification of said bird and also improve its weighing.

Each individualized monitoring device 100 also comprises a feed weighing means 20 able to measure the weight of the feeder 50. Such a weighing means 20 allows to measure the weight of the feeder 50 and to monitor its evolution over time, and therefore to deduce the amount of feed consumed over time, so as to derive the individual consumption of the birds by correlating this consumption data with the identification data of the birds. The weighing means 20 may for example be a bending sensor, a force sensor, or a pressure sensor, producing an electrical, optical or magnetic signal proportional to the feed amount in the feeder 50. The sensors used may for example be strain gages, piezoelectric sensors, piezoresistive sensors, or capacitive pressure sensors.

According to a preferred embodiment, the weighing means 20 comprises at least one sensor, preferably of the piezoelectric or piezocapacitive type, or at least one strain gage, positioned between a rear cross member 82 and the feeder 50. Even more preferably, the weighing station 30 is connected to a rear cross member 82 by at least one piezoelectric- or piezoresistive-type sensor.

Each individualized monitoring device 100 further comprises an identification means 40 adapted for reading an individual identification code carried by a bird. This identification means 40 allows for the individual identification of the bird which comes to feed in the feeder 50 associated to the weighing station 30. Thus, various identification technologies may be envisaged such as code, bar code, or radio frequency systems. The identification means 40 may comprise, for example, a camera, a bar code scanner, or a radio frequency reader. Preferably, the identification means 40 comprises a radio frequency reader able to receive information from a radio frequency (e.g. RFID or NFC) tag attached to said bird. Thus, each bird may be provided with a radio frequency (e.g. RFID or NFC) tag, preferably encapsulated in a glass capsule.

The radio frequency reader is preferable positioned close to a front or side wall of the weighing station 30. By "close" should be understood that it is provided on a side wall or on the front wall of the weighing station 30, or that it is integrated in one of said walls. It should also be understood that it can be positioned at a distance between 0.1 cm and 10 cm from one of the side or front walls of the weighing station 30. Advantageously, the radio frequency (e.g. RFID) reader is positioned at a distance between 0.2 cm and 8 cm from one of the side or front walls of the weighing station 30. In fact, such positioning improves the reading performance of the radio frequency (e.g. RFID) tags by the radio frequency (e.g. RFID) reader and reduces the interference between the signals of the different radio frequency (e.g. RFID) tags.

As shown in FIGS. 5A and 5B, the device 100 for the individualized monitoring of the feed conversion ratio of poultry may be integrated in a monitoring facility 1 comprising several devices 100 arranged for example in a linear manner. The devices 100 may also be arranged circularly or in the form of a polygon. More specifically, the installation 1 comprises several individualized monitoring devices 100 which are mounted on a single frame 80 having for example a generally rectangular parallelepiped shape as shown in FIGS. 5A and 5B.

The number of these individualized monitoring devices 100 for a same installation 1 may vary. Given the design of the device 100 according to the invention, it is possible to position each of the individualized monitoring devices 100 very closely without the birds getting in each other's way. Preferably, the distance between two adjacent individualized monitoring devices 100 is at most 10 cm, more preferably at most 5 cm. The distance between two adjacent individualized monitoring devices 100 can be evaluated by measuring the distance between the two sidewalls of the adjacent weighing stations 30. Preferably, the provided monitoring installation 1 comprises between 2 and 10 individualized monitoring devices 100, and more preferably it comprises between 2 and 6 individualized monitoring devices 100.

As can be seen from FIGS. 5A and 5B, each individualized monitoring device 100 is advantageously mounted on the same frame 80. More particularly, all the weighing stations 30 are attached directly or indirectly to a first cross member 81 and all feeders are attached directly or indirectly to a second cross member 82. When said attachments are indirect, they are advantageously done via weighing means 10 or 20 for the weighing stations and the feeders, respectively.

As shown in FIGS. 5A and 5B, in the embodiment shown, the monitoring installation 1 comprises four individualized monitoring devices 100. The feeders are attached to a rear cross member 82 of the frame 80 via the weighing device 30. The weighing stations 30 are attached on a front cross member 81 of the frame 80 via the bird weighing means 10. Preferably, each weighing station 30 is connected to a same cross member by at least one bird weighing means 10. Preferably, each feeder 50 is connected to a same cross member by at least one weighing means 20. Using the same cross member, on the one hand, for all the weighing stations 30 and, on the other hand, for all the feeders 50, allows to simplify the structure of the installation and to improve its robustness.

In addition, the monitoring installation 1 may comprise a system 70 for moving the feeders 50. In this case, the feeders 50 may be attached directly or indirectly (e.g. via a weighing means 20) to a cross member, wherein said cross member is able to be moved at least along one axis, wherein said axis is selected from a vertical, horizontal, or transverse axis, by a displacement means 70 so as to adjust, to the size of the bird, the distance between the feed dispensing area 51 of the feeder 50 and the weighing station 30.

The individualized monitoring device 100 or the monitoring installation 1 further comprise or are coupled to a data processing module. This data processing module is connected to the feed weighing means, to the bird weighing means and to the identification means, preferably by wired connections. It can also be arranged at a distance from said means. Thus, all the information collected by the identification means 40 and the weighing means 10, 20 are preferably transmitted to the data processing module. This data processing module preferably comprises a receiver for receiving the data measured by the weighing means 10, 20 and the identification means 40 of each individualized monitoring device 100, and a calculator for processing said measured data. Communication between the identification means 40 and the weighing means 10, 20 and the receiver of the processing unit may be wired or non-wired.

The processing unit is designed to process the collected data in order to deduce individual feed conversion ratio for each bird of the farm. In addition to daily consumption per animal, it is possible to study the date, the frequency and the duration of meals to draw conclusions about the feeding behavior of the birds, and correlate this information to their growth. Moreover, the collected data allow the data processing module to calculate the feed conversion ratio, that is to say the ratio amount of feed consumed by the bird/weight gain of the bird.

Monitoring the evolution of the weight of the feeder associated with the identification of the animal which comes to eat allows to establish the consumption curve of this animal. Data processing can also read out the consumption hours (beginning, duration, end) for an animal so as to refine its consumption curve.

The study of the individual consumption of birds reared in groups on the floor is particularly advantageous since it allows to introduce a new selection criterion for these birds which corresponds to the feed efficiency under conventional rearing conditions.

The invention claimed is:

1. A device for individualized monitoring of a feed conversion ratio of poultry comprising:
    a weighing station defining an available internal volume configured to accommodate only one bird at a time through an entrance thereof, said entrance being free of a door such that a bird located in said available internal volume for feeding is free to exit therefrom,
    a bird identification means configured to identify said one bird from among a plurality of birds having access to said weighing station,
    a bird weighing means effective to measure a weight of said one bird positioned in the available internal volume of the weighing station,
    a feeder for containing poultry feed coupled to a feed weighing means, said feed weighing means being effective to measure a weight of feed contained in the feeder, said feeder comprising a dispensing area accessible only to said one bird positioned in the available internal volume of the weighing station, and
    a data processing module coupled to the bird weighing means and to the feed weighing means, said data processing module being configured to generate a feed conversion ratio from the measured weight of said one bird and the measured weight of said feed in said feeder correlated to identification information for said one bird.

2. The individualized monitoring device according to claim 1, wherein the weighing station comprises a front wall having an opening able to allow the head of said one bird to pass, said opening having a shape defined by a variable height and width, wherein said width increases with said height over a vertical distance of said opening.

3. The individualized monitoring device according to claim 2, the opening having a substantially trapezoid or triangle shape, wherein the base of the triangle or the longest base of the trapezoid is oriented towards an upper part of the front wall.

4. The individualized monitoring device according to claim 1, the weighing station comprising side walls, wherein said front wall and side walls are not movable.

5. The individualized monitoring device according to claim 1, further comprising a restraint system comprising an insert for adapting the available internal volume of the weighing station to the size of said one bird.

6. The individualized monitoring device according to claim 5, the restraint system being removable.

7. The individualized monitoring device according to claim 5, the weighing station comprising guide members for the restraint system.

8. The individualized monitoring device according to claim 1, the feeder being movable to adjust a distance between the feed dispensing area of the feeder and the weighing station according to the size of said one bird.

9. The individualized monitoring device according to claim 1, the identification means comprising a radio frequency reader configured to receive information from a radio frequency tag attached to said one bird.

10. The individualized monitoring device according to claim 9, the radio frequency reader being positioned close to a front wall or a side wall of the weighing station.

11. An installation for individualized monitoring of a feed consumption ratio of poultry, comprising a plurality of individualized monitoring devices according to claim 1.

12. The installation according to claim 11, wherein the feeders of said individualized monitoring devices are attached directly or indirectly to a cross member configured to be moved by a displacement means.

13. The installation according to claim 11, the weighing stations of the individualized monitoring devices being attached directly or indirectly to a first cross member, the feeders of the individualized monitoring devices being attached directly or indirectly to a second cross member and being movable in unison to uniformly adjust respective distances between each said feeder and the associated weighing station according to an average size of said plurality of birds.

14. The individualized monitoring device according to claim 5, said insert further comprising means blocking part of an entrance of the weighing station to prevent others of said plurality of birds from entering said available internal volume at the same time as said one bird.

15. The individualized monitoring device according to claim 1, said feeder being coupled to at least one displacement means configured to move the feeder along a horizontal axis and a vertical axis, so as to adjust a distance between said dispensing area of the feeder and the weighing station based on the size of said one bird.

16. A device for individualized monitoring of feed conversion ratios of a plurality of birds, the device comprising:
    a weighing station defining an available internal volume configured to admit only one of said birds at a time through an entrance thereof, said entrance being free of a door such that a bird located in said available internal volume for feeding is free to exit therefrom, the weighing station comprising a radio frequency reader configured to receive identifying information from radio frequency tags attached respectively to each of said birds and thereby to identify which of said birds is within said available internal volume, and bird weighing means for detecting a weight of a bird located in the available internal volume;
    a feeder comprising a feed dispensing area accessible only to a bird located in said available internal volume, and feed weighing means for detecting a weight of feed in said feeder; and
    a data processing module configured to calculate and monitor respective feed conversion ratios for each of said plurality of birds as said birds individually enter said available internal volume and feed from said feed dispensing area over time.

17. The device according to claim 16, said weighing station further comprising a front wall opposite said entrance and located adjacent to said feeder, said front wall comprising an opening having a variable width that increases with its height adapted configured to accommodate a head of a bird located in said available internal volume in order to access said feed dispensing area.

18. The device according to claim 16, said weighing station having side walls that converge from a rear end adjacent to an entrance thereof to a front end adjacent to said feeder.

19. The device according to claim 16, further comprising a plurality of different-sized removable inserts for adjusting an effective size of said available internal volume of said weighing station based on an average size of said plurality of birds.

20. The device of claim 16, said feeder being movable in order to adjust a distance between said feed dispensing area and said weighing station to accommodate different neck lengths of said birds as they grow over time.

\* \* \* \* \*